United States Patent

Shimura

[11] Patent Number: 5,900,911
[45] Date of Patent: * May 4, 1999

[54] SIGNAL ENCODING METHOD SEPARATING A QUANTIZED SIGNAL INTO A BINARY SIGNAL AND A SIGN AND INTENSITY SIGNAL

[75] Inventor: Kazuo Shimura, Kanagawa-ken, Japan

[73] Assignee: Fuji Photo Film Co., LTD., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,147

[22] Filed: Jan. 30, 1997

[30] Foreign Application Priority Data

Jan. 30, 1996 [JP] Japan ................................ P8-14511

[51] Int. Cl.$^6$ ................................................. H04N 7/12
[52] U.S. Cl. ........................................ 348/408; 382/240
[58] Field of Search .................................. 382/240, 237, 382/248, 251, 246, 244; 358/426, 261.3, 432, 433, 539; 348/403, 408, 421, 27, 405, 404, 406; 341/200, 105; H04N 7/12

[56] References Cited

U.S. PATENT DOCUMENTS

| | | | |
|---|---|---|---|
| 4,258,264 | 3/1981 | Kotera et al. | 250/484 |
| 4,776,029 | 10/1988 | Shimura | 382/56 |
| 5,086,489 | 2/1992 | Shimura | 382/56 |
| 5,384,868 | 1/1995 | Maeda et al. | 382/240 |
| 5,446,806 | 8/1995 | Ran et al. | 382/240 |
| 5,467,404 | 11/1995 | Vuylsteke et al. | 382/274 |
| 5,621,466 | 4/1997 | Miyane et al. | 348/405 |
| 5,661,822 | 8/1997 | Knowles et al. | 382/233 |
| 5,699,169 | 12/1997 | Nakatani et al. | 358/426 |
| 5,708,509 | 1/1998 | Abe | 358/426 |
| 5,729,625 | 3/1998 | Miyake | 382/237 |

FOREIGN PATENT DOCUMENTS

| | | | |
|---|---|---|---|
| 0 610 604 | 8/1994 | European Pat. Off. | G06F 15/68 |
| 56-11395 | 2/1981 | Japan | G21K 4/00 |

OTHER PUBLICATIONS

"Fast Filter Transforms for Image Processing" P.J. Burt, Computer Graphics and Image Processing, vol. 16, pp. 20–51, 1981.

"Fast Computation of the Difference of Low Pass Transform" J.L. Crowley et al., IEEE Trans. on Pattern Analysis and Machine Intelligence, vol. 6, No. 2, Mar. 1984, pp. 212–222.

"A Theory for Multiresolution Signal Decomposition; The Wavelet Representation" S.G. Mallat, IEEE Trans. on Pattern Analysis and Machine Intelligence, vol. 11, No. 7, Jul. 1989, pp. 674–693.

"Image compression by Gabor Expansion" T. Ebrahimi et al., Optical Engineering, vol. 30, No. 7, pp. 873–880, Jul. 1991.

(List continued on next page.)

Primary Examiner—Tommy P. Chin
Assistant Examiner—Y. Lee
Attorney, Agent, or Firm—Sughrue,Mion,Zinn Macpeak & Seas, PLLC

[57] ABSTRACT

A signal is quantized, and a quantized signal is thereby obtained. The quantized signal is separated into a binary signal, which represents whether the signal values of the quantized signal are equal to zero or are other than zero, and a sign and intensity signal, which is constituted of a sign and intensity with respect to signal components of the quantized signal having signal values other than zero. The binary signal is converted such that the information of the binary signal, which represents N number of picture elements, may be converted into a signal, which represents a single picture element and is composed of Nnumber of bits. The converted binary signal, which has been obtained from the conversion, the sign and intensity signal are then encoded. The encoding efficiency is thereby enhanced, and the amount of the signal after being encoded is kept small.

8 Claims, 9 Drawing Sheets

OTHER PUBLICATIONS

"Multiscale Image Contrast Amplification" by P. Vuylsteke et al., SPIE, vol. 2167, Image Processing (1994) pp. 551–560.

"Wavelets and Signal Processing" O. Rioul et al., IEEE SP Magazine, pp. 14–38, Oct. 1991.

"Zero–Crossings of a Wavelet Transform" S. Mallat, IEEE Transactions on Information Theory, vol. 37, No. 4, pp. 1019–1033, Jul. 1991.

"Image Coding Using Wavelet Transform" M. Antonini et al., IEEE Transactions on Image Processing, vol. 1, No. 2, pp. 205–220, Apr. 1992.

SIGNAL ENCODING METHOD SEPARATING A QUANTIZED SIGNAL INTO A BINARY SIGNAL AND A SIGN AND INTENSITY SIGNAL

BACKGROUND OF THE INVENTION

1. Field of the Invention

This invention relates to a method for encoding a signal. This invention particularly relates to a signal encoding method, wherein a signal is compressed with variable code length encoding.

2. Description of the Prior Art

Image signals representing continuous tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of continuous tone images on optical disks, magnetic disks, or the like, has been generally put into practice. In such cases, image signal compression is generally carried out for the purpose of efficiently recording the image signals on a recording medium.

As one of the methods for compressing an image signal, a compressing processing method utilizing prediction encoding has heretofore been employed. Specifically, in cases where an image signal is to be stored or transmitted, the image signal is subjected to compression processing based on prediction encoding, and the amount of the image signal is thereby reduced. The compressed image signal is then stored or transmitted. When the image which is represented by the image signal is to be reproduced, the compressed image signal is subjected to decoding processing and is thereby decompressed. Thereafter, a visible image is reproduced from the decompressed image signal.

Also, as one of the methods for compressing an image signal, a method utilizing vector quantization has heretofore been used. The method comprises the steps of (i) dividing a two-dimensional image signal into blocks, each of which comprises the image signal components representing an arbitrary number K of picture elements adjacent to one another in the image, (ii) selecting a vector, which corresponds with the minimum distortion to the set of the image signal components in each of the blocks, from a code book composed of a plurality of vectors, which are different from one another and prepared in advance by defining K number of vector elements, and (iii) encoding the information, which represents the selected vector, in association with the block.

Since the image signal components in the block as described above have high correlation to one another, the image signal components in each block can be represented very accurately by one of a comparatively small number of vectors prepared in advance. Therefore, instead of the actual image signal being transmitted or recorded, transmission or recording of the image signal can be carried out by transmitting or recording the codes representing the vectors. In this manner, signal compression can be achieved. By way of example, the amount of the image signal components, which represent 64 picture elements in a continuous tone image having 256 levels (=8 bits) of density scale, is equal to 512 bits (=8×64). In such cases, the image signal components representing the 64 picture elements may be grouped as a single block, and the image signal components in the block may be represented by a vector, which is composed of 64 vector elements. Also, a code book including 256 such vectors may be prepared. In such cases, the amount of the information per block becomes equal to the amount of the information required to discriminate between the vectors, i.e. 8 bits. Consequently, in such cases, the amount of the signal can be compressed to $8/(8\times64)=1/64$.

The image signal is compressed in the manner described above, and the compressed image signal is recorded or transmitted. Thereafter, the vector elements of each of the vectors, which are represented by the vector discriminating information, are taken as reconstructing information for each of the blocks, and the original image is reproduced by using the reconstructing information.

One approach to improvement of the compressibility in the image signal compression by prediction encoding is to decrease the bit resolution (density resolution) of the image signal, i.e. to carry out quantization processing for quantizing the image signal more coarsely, in addition to prediction encoding processing.

Therefore, in U.S. Pat. No. 4,776,029, the applicant proposed a method for encoding a signal with interpolation encoding, wherein the prediction encoding technique and the quantization technique are combined with each other. With the proposed method, image signal components of an image signal are classified into main components, which have been sampled at appropriate sampling intervals, and interpolated components other than the main components. The interpolated components are then subjected to interpolation prediction encoding processing based on the main components, i.e. the values of the interpolated components are predicted with the interpolation prediction from the main components. Thereafter, prediction errors between the predicted values and the actual values of the interpolated components are encoded into variable length codes, such as Huffman codes (i.e. are converted into codes, the lengths of which vary for different values of the prediction errors). In this manner, the image signal is encoded.

With the Huffman encoding, for example, the occurrence probability of a certain signal is calculated. In accordance with the frequency of occurrence of each signal value, a short code is allocated to a signal value which occurs more frequently, and a long code is allocated to a signal value which occurs less frequently. In this manner, the amount of code for the entire signal is kept small.

During the compression of an image signal, the image signal compressibility should be as high as possible. However, it is technically difficult to increase the compressibility markedly during the interpolation encoding. Therefore, in order for a high compressibility to be achieved, it is considered that component number decreasing processing, which results in a coarse spatial resolution, and the interpolation encoding be combined with each other.

Therefore, in U.S. Pat. No. 5,086,489, the applicant proposed a method for compressing an image signal, wherein the interpolation encoding and the component number decreasing processing are combined with each other, and wherein a high compressibility is achieved while good image quality is being kept.

As methods for processing image signals, the so-called "multi-resolution transform methods" have heretofore been proposed. With the proposed multi-resolution transform methods, an image is transformed into multi-resolution images, each of which is of one of a plurality of different frequency bands. Each of the multi-resolution images of the different frequency bands is subjected to predetermined processing and is then subjected to inverse multi-resolution transform. In this manner, an ultimate processed image is obtained. As the technique for transforming the image into the multi-resolution images, a wavelet transform, a Laplacian pyramid technique, a Fourier transform, or the like, is employed.

How the wavelet transform is carried out will be described hereinbelow.

The wavelet transform has recently been developed as a frequency analysis method and has heretofore been applied to stereo pattern matching, signal compression, and the like. The wavelet transform is described in, for example, "Wavelets and Signal Processing," by Olivier Rioul and Martin Vetterli, IEEE SP Magazine, pp. 14–38, October 1991; and "Zero-Crossings of a Wavelet Transform," by Stephane Mallat, IEEE Transactions on Information Theory, Vol. 37, No. 4, pp. 1019–1033, July 1991.

With the wavelet transform, a signal is transformed into frequency signals, each being of one of a plurality of different frequency bands, by utilizing a function h, which is shown in FIG. 9, as a basic function and in accordance with the formula $$W(a, b) = \int_{-\infty}^{\infty} f(t)h(a, b)dt \quad (1)$$

wherein f(t): the signal having an arbitrary wave form,

W(a,b): the wavelet transform of f(t), $$h(a, b) = \frac{1}{\sqrt{a}} h(at - b)$$

a: the degree of contraction of the function, b: the amount of movement in the horizontal axis direction.

Therefore, the problems with regard to a false oscillation, which occurs with Fourier transform, do not occur. Specifically, when filtering processing is carried out by changing the period and the degree of contraction of the function h and moving the function h on an original signal, frequency signals, each of which is adapted to one of desired frequencies ranging from a fine frequency to a coarse frequency. By way of example, FIG. 10 shows signals, which are obtained by carrying out the wavelet transform on an original signal Sorg and then carrying out inverse wavelet transform for each of frequency bands. FIG. 11 shows signals, which are obtained by carrying out Fourier transform on the original signal Sorg and then carrying out inverse Fourier transform for each of the frequency bands. As will be understood from FIGS. 10 and 11, the wavelet transform has the advantage over the Fourier transform in that a frequency signal of a frequency band corresponding to the oscillation of the original signal Sorg can be obtained. Specifically, with the Fourier transform, an oscillation occurs in a part B' of a frequency band h, which corresponds to a part B of the original signal Sorg. However, with the wavelet transform, as in the original signal Sorg, no oscillation occurs in a part A' of a frequency band hh, which corresponds to a part A of the original signal Sorg.

Also, a method for compressing an image signal by utilizing the wavelet transform has been proposed in, for example, "Image Coding Using Wavelet Transform" by Marc Antonini, et al., IEEE Transactions on Image Processing, Vol. 1, No. 2, pp. 205–220, April 1992.

With the proposed method, wavelet transform is carried out on an original image signal representing an image, and the original image signal is thereby transformed into image signals, each being of one of a plurality of different frequency bands. Thereafter, vector quantization is carried out on each of the image signals such that a small number of bits per picture element may be allocated to an image signal of a high frequency band, which image signal carries much noise, and a large number of bits per picture element may be allocated to an image signal of a low frequency band, which image signal carries the information representing the major object. In this manner, the original image signal is compressed. With the proposed method, the compressibility of the original image signal can be kept high. Also, the original image can be restored perfectly by carrying out inverse wavelet transform on the compressed image signal.

The Laplacian pyramid technique is proposed in, for example, U.S. Pat. No. 5,467,404 and EP 610604 A1. With the proposed Laplacian pyramid technique, mask processing is carried out on the original image by using a mask having characteristics such that it may be approximately represented by a Gaussian function. A sub-sampling operation is then carried out on the resulting image in order to thin out the number of the picture elements to one half along each of two-dimensional directions of the array of the picture elements in the image, and an unsharp image having a size of one-fourth of the size of the original image is thereby obtained. Thereafter, a picture element having a value of 0 is inserted into each of the points on the unsharp image, which were eliminated during the sampling operation, and the image size is thereby restored to the original size. Mask processing is then carried on the thus obtained image by using the aforesaid mask, and an unsharp image is thereby obtained. The thus obtained unsharp image is subtracted from the original image, and a detail image of a predetermined frequency band of the original image is thereby obtained. This processing is iterated with respect to the obtained unsharp image, and an arbitary number N of unsharp images having sizes of $\frac{1}{2}^{2N}$ of the size of the original image are thereby formed. As described above, the sampling operation is carried out on the image, which has been obtained from the mask processing with the mask having characteristics such that it may be approximately represented by the Gaussian function. Therefore, though the Gaussian filter is used actually, the same processed image as that obtained when a Laplacian filter is used is obtained. Also, in this manner, the images of low frequency bands, which have the sizes of $\frac{1}{2}^{2N}$ of the size of the original image are successively obtained from the image of the original image size. Therefore, the group of the images obtained as a result of the processing is referred to as the Laplacian pyramid.

The Laplacian pyramid technique is described in detail in, for example, "Fast Filter Transforms for Image Processing" by Burt P. J., Computer Graphics and Image Processing, Vol. 16, pp. 20–51, 1981; "Fast Computation of the Difference of Low-Pass Transform" by Growley J. L., Stern R. M., IEEE Trans. on Pattern Analysis and Machine Intelligence, Vol. 6, No. 2, March 1984; "A Theory for Multiresolution Signal Decomposition; The Wavelet Representation" by Mallat S. G., IEEE Trans. on Pattern Analysis and Machine Intelligence, Vol. 11, No. 7, July 1989; "Image Compression by Gabor Expansion" by Ebrahimi T., Kunt M., Optical Engineering, Vol. 30, No. 7, pp. 873–880, July 1991; and "Multiscale Image Contrast Amplification" by Pieter Vuylsteke, Emile Schoeters, SPIE, Vol. 2167, Image Processing (1994), pp. 551–560.

However, with the aforesaid methods for compressing an image signal by utilizing the multi-resolution transform, it is necessary for the image signal to be compressed by vector quantization. Therefore, if the compressibility is increased even further, there will be the risk that the image quality of the original image is lost. Thus there is a limit in the increase in the compressibility of the image signal. Also, in cases where an image signal is quantized, if the number of bits per picture element is set at a large value during the quantization of the image signal, the compressibility of the image signal will become low, but a compressed image signal can be obtained which represents an image close to the original image. Therefore, in such cases, the image quality of the image reconstructed from the compressed image signal can be kept good. If the number of bits per picture element is set at a small value, a large error will occur in restoring the original image signal from the compressed image signal. Such an error appears as noise in the restored image. Therefore, in such cases, the image quality of the image reconstructed from the compressed image signal becomes bad. However, in such cases, the lengths of the codes become short during the encoding, and therefore the signal compressibility can be kept high.

Therefore, the applicant proposed a novel method for compressing an image signal in U.S. Ser. No. 08/253,857. With the proposed method for compressing an image signal, wavelet transform is carried out on the original image signal, and the original image signal is thereby decomposed into the image signals, each being of one of a plurality of different frequency bands. The degree of importance of each of different portions of the image is determined from one of the image signals, and labeling processing is carried out on the image in accordance with the determined degree of importance of each of different portions of the image. In accordance with the results of the labeling processing, the image signals are quantized such that a larger number of bits may be allocated to each of picture elements in a portion of the image determined as having a higher degree of importance, and such that a smaller number of bits may be allocated to each of picture elements in a portion of the image determined as having a low degree of importance. Accordingly, with the proposed method for compressing an image signal, as for an important portion of the image, the image signals can be compressed such that the image quality may be kept good. As for an image portion which is not important, the image signals can be compressed with a high compressibility. As a result, the compressibility of the image signals can be kept high such that the image quality of the important portion of the image may not become bad.

However, in the various methods for compressing signals described above, the problems are encountered in that, in cases where the quantized signal is encoded with the Huffman encoding, or the like, as the amount of information to be encoded (entropy) becomes small, the encoding efficiency becomes low. Specifically, in the Huffman encoding, it is necessary that 1 bit per picture element be allocated to the quantized signal, and therefore the mean code length cannot be set to be less than 1. As a result, even if the amount of information of the quantized signal (entropy) is equal to approximately 1 or less than 1, the encoded signal will always have 1 bit, and therefore the encoding efficiency (=entropy/mean code length) cannot be kept high.

SUMMARY OF THE INVENTION

The primary object of the present invention is to provide a signal encoding method, wherein a signal is compressed with variable code length encoding, such as Huffman encoding, such that the encoding efficiency may be kept high.

Another object of the present invention is to provide a signal encoding method, wherein the amount of the signal after being encoded is reduced markedly.

The present invention provides a signal encoding method for encoding a signal, comprising the steps of:
i) quantizing the signal, a quantized signal being thereby obtained,
ii) separating the quantized signal into a binary signal, which represents whether the signal values of the quantized signal are equal to zero or are other than zero, and a sign and intensity signal, which is constituted of a sign and intensity with respect to signal components of the quantized signal having signal values other than zero,
iii) converting the binary signal such that the information of the binary signal, which represents N picture elements, may be converted into a signal, which represents a single picture element and is composed of N bits, a converted binary signal being thereby obtained, and
iv) encoding the converted binary signal and the sign and intensity signal.

In the signal encoding method in accordance with the present invention, the processing for carrying out the separation, the conversion, and the encoding should preferably be iterated a plurality of times with respect to the converted binary signal.

With the signal encoding method in accordance with the present invention, the given signal is quantized, and the quantized signal is thereby obtained. The quantized signal is then separated into the binary signal, which represents whether the signal values of the quantized signal are equal to zero or are other than zero, and a sign and intensity signal, which is constituted of a sign and intensity with respect to signal components of the quantized signal, the signal values of which are other than zero. The binary signal is a signal of 1 bit per picture element and represents a value of zero or one. Thereafter, the binary signal is converted such that the information of the binary signal, which represents N picture elements, may be converted into the information of a single picture element. From the conversion, a signal of N bits per picture element can be obtained. For example, in cases where the information of the binary signal, which represents four picture elements, is converted into a signal representing a single picture element, a signal of 16 bits per picture element can be obtained. The converted binary signal having thus been obtained from the conversion is then encoded with Huffman encoding, or the like. With the encoding, in the shortest case, N picture elements can be represented with 1 bit. Therefore, for example, in cases where the information of the binary signal representing four picture elements is represented by a single picture element, the mean code length becomes equal to 0.25 bit (=1 bit/4 picture elements). In this manner, the mean code length can be kept short. Specifically, the mean code length can be reduced to a value shorter than the limit value (1 bit per picture element) in the Huffman encoding. Therefore, even in cases where the amount of information per picture element is less than 1 bit, the encoding efficiency can be prevented from becoming low, and the encoding can be carried out efficiently. Also, since N picture elements are processed as a single picture element, the encoding efficiency can be enhanced, and the amount of information can be reduced. Therefore, the entropy can be enhanced, and the amount of signal after being encoded can thereby be reduced even further. Further, since the amount of signal can thus be reduced, a large number of signals can be stored on a recording medium, and the signal storage cost can be kept low. Furthermore, since the amount of signal can be kept small, the time required to transfer the signal can be kept short.

As described above, with the signal encoding method in accordance with the present invention, the converted binary signal, which has been obtained from the conversion in the manner described above, may be separated into a binary signal, which represents whether the signal values are equal to zero or are other than zero, and a sign and intensity signal, which is constituted of a sign and intensity with respect to signal components having signal values other than zero. Thereafter, the thus obtained binary signal may be converted such that the information of the binary signal, which represents N picture elements, may be converted into a signal, which represents a single picture element. The processing for carrying out the aforesaid separation of the converted binary signal and the aforesaid conversion may be iterated a plurality of times. In such cases, the mean code length can be shortened even further, and the encoding efficiency can be enhanced even further.

DESCRIPTION OF THE PREFERRED EMBODIMENTS

The present invention will hereinbelow be described in further detail with reference to the accompanying drawings.

Figure 1:
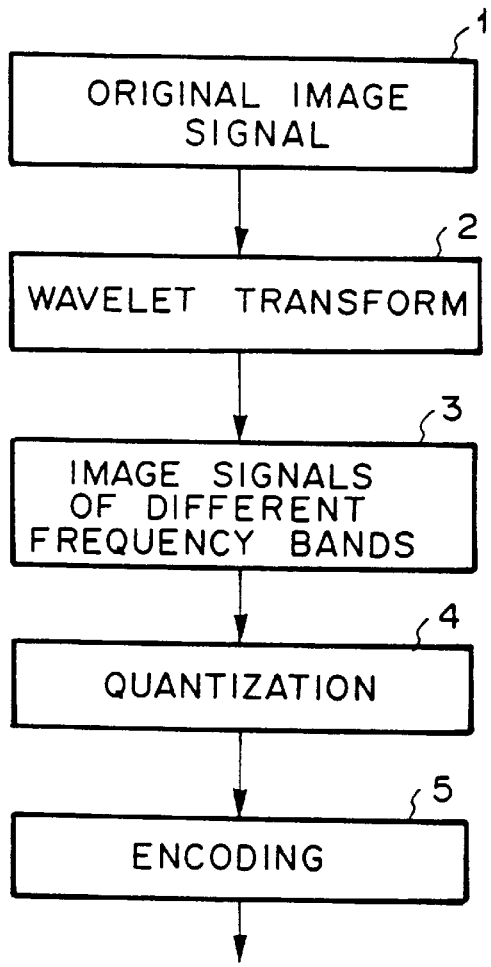
FIG. 1 is a block diagram showing a fundamental concept behind a method for compressing an image signal, in which the signal encoding method in accordance with the present invention is employed.

FIG. 1 is a block diagram showing a fundamental concept behind a method for compressing an image signal, in which the signal encoding method in accordance with the present invention is employed. As illustrated in FIG. 1, with the method for compressing an image signal, in which the signal encoding method in accordance with the present invention is employed, image signals, each of which is of one of a plurality of different frequency bands, are obtained from multi-resolution transform and encoded. Specifically, in a step 1, an original image signal representing an original image is obtained. In a step 2, wavelet transform, which is one of the techniques for the multi-resolution transform, is carried out on the original image signal. In this manner, in a step 3, image signals, each of which is of one of a plurality of different frequency bands, are obtained from the wavelet transform. Thereafter, in a step 4, the image signals, each of which is of one of a plurality of different frequency bands, are quantized. Also, in a step 5, the quantized image signals having been obtained from the quantization are encoded.

The method for compressing an image signal, in which an embodiment of the signal encoding method in accordance with the present invention is employed, will be described hereinbelow.

Figure 2:
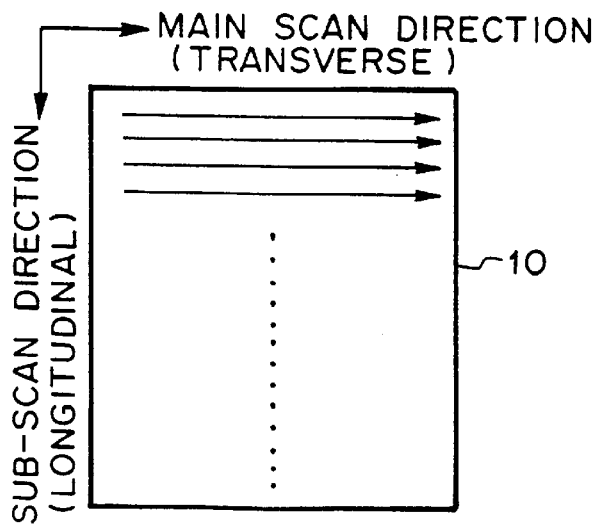
FIG. 2 is an explanatory view showing how an image signal is detected from a stimulable phosphor sheet on which an image has been stored.

This embodiment is applied to an original image signal having been obtained in a radiation image recording and reproducing system, which utilizes a stimulable phosphor sheet and which is described in, for example, U.S. Pat. No. 4,258,264 and Japanese Unexamined Patent Publication No. 56(1981)-11395. The original image signal is detected as a digital image signal by scanning a stimulable phosphor sheet, on which a radiation image of a human body has been stored, with a laser beam. As illustrated in FIG. 2, when the operation for reading out the radiation image is carried out, a stimulable phosphor sheet 10, on which the radiation image has been stored, is scanned with a laser beam in a main scanning direction (i.e., in the transverse direction). Also, the stimulable phosphor sheet 10 is moved in a sub-scanning direction (i.e., in the longitudinal direction). In this manner, the stimulable phosphor sheet 10 is scanned in two directions with the laser beam.

Thereafter, wavelet transform is carried out on the original image signal.

Figure 3:
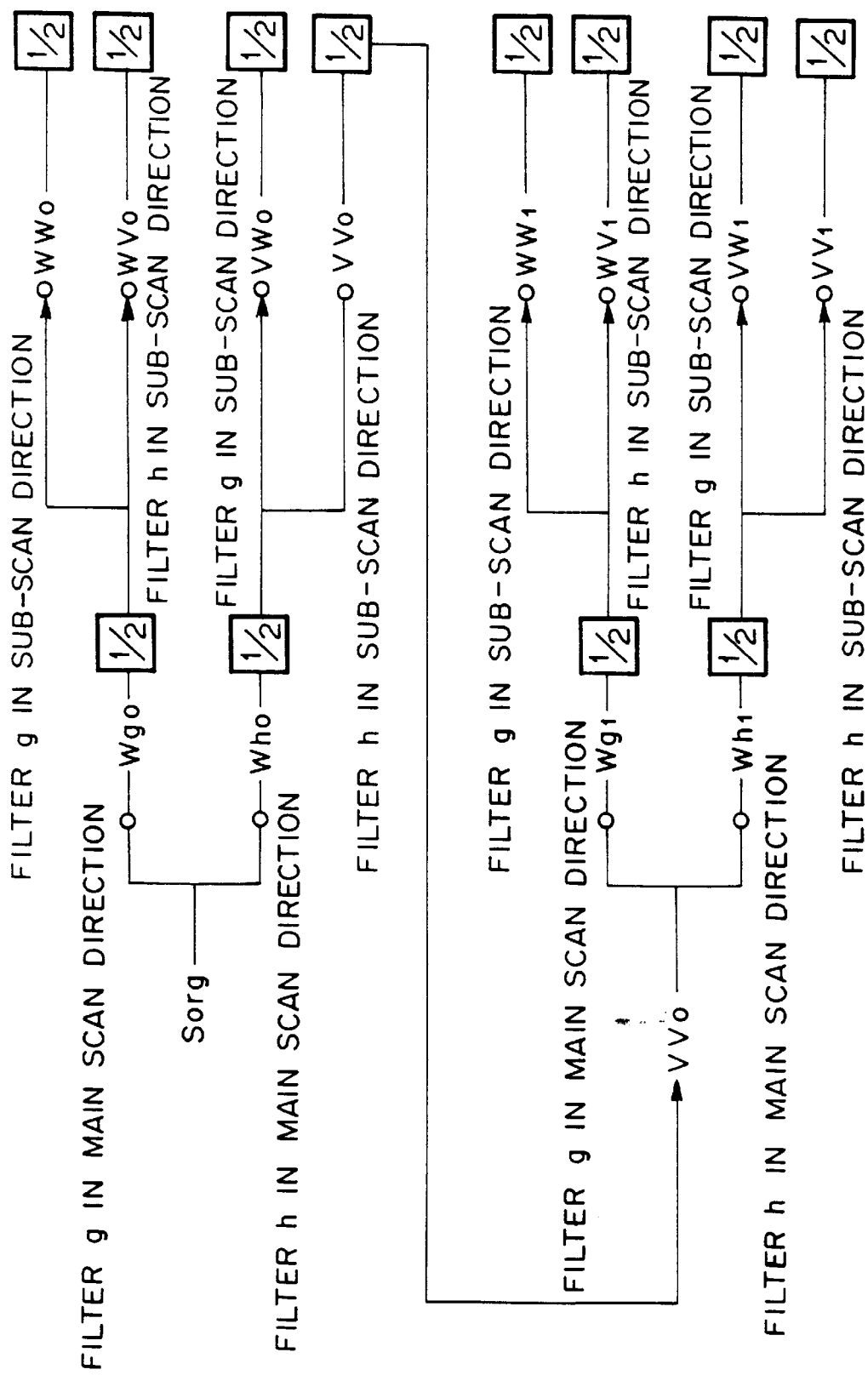
FIG. 3 is a flow chart showing how wavelet transform is carried out.

FIG. 3 is a flow chart showing how the wavelet transform is carried out on an original image signal Sorg.

In this embodiment, orthogonal wavelet transform, in which the respective wavelet transform factors are orthogonal, is carried out. The orthogonal wavelet transform is described in the aforesaid literature of Marc Antonini, et al.

As illustrated in FIG. 3, filtering processing is carried out with a function g and a function h, which are obtained from the basic wavelet function, on the image signal components of the original image signal Sorg representing picture elements in the radiation image, which are located along the main scanning direction. Specifically, the filtering processing on the image signal components of the original image signal Sorg representing each row of the picture elements, which are arrayed along the main scanning direction, is carried out with the function g and the function h each time the position of the filtering processing is shifted by a single picture element in the sub-scanning direction. In this manner, wavelet transform factor signals Wg0 and Wh0 with respect to the main scanning direction of the original image signal Sorg are obtained.

The function g and the function h can be uniquely obtained from the basic wavelet function. For example, the function h has the characteristics shown in Table 1 below. In Table 1, a function h' is the one which is used when inverse wavelet transform is carried out on an image signal having been subjected to wavelet transform. As will be understood from Formula (2), the function g can be obtained from the function h', and a function g' to be used during inverse wavelet transform can be obtained from the function h.

TABLE 1

| n | 0 | ±1 | ±2 | ±3 | ±4 |
|---|---|---|---|---|---|
| $2^{-\frac{1}{2}}h$ | 0.602949 | 0.266864 | −0.078223 | −0.016864 | 0.026749 |
| $2^{-\frac{1}{2}}h'$ | 0.557543 | 0.295636 | −0.028772 | −0.045636 | 0 |

$$g' = (-1)^n h$$
$$g = (-1)^n h' \quad (2)$$

The wavelet transform factor signals Wg0 and Wh0 are obtained in the manner described above. Thereafter, for each of the wavelet transform factor signals Wg0 and Wh0, the signal components representing the picture elements located along the main scanning direction are thinned out alternately. In this manner, the number of the picture elements located along the main scanning direction is reduced to ½. Filtering processing is then carried out with the function g and the function h on the signal components of the thinned-out wavelet transform factor signals Wg0 and Wh0, which signal components represent picture elements located along the sub-scanning direction. From the filtering processing, wavelet transform factor signals $WW_0$, $WV_0$, $VW_0$, and $VV_0$ are obtained.

Thereafter, for each of the wavelet transform factor signals $WW_0$, $WV_0$, $VW_0$, and $VV_0$, the signal components representing the picture elements located along the sub-scanning direction are thinned out alternately. In this manner, the number of the picture elements located along the sub-scanning direction is reduced to ½. As a result, the number of the picture elements represented by each of the wavelet transform factor signals $WW_0$, $WV_0$, $VW_0$, and $VV_0$ becomes equal to ¼ of the number of the picture elements represented by the original image signal Sorg. Filtering processing is then carried out with the function g and the function h on the signal components of the wavelet transform factor signal $VV_0$, which represent picture elements located along the main scanning direction.

Specifically, the filtering processing on the image signal components of the wavelet transform factor signal $VV_0$ representing each row of the picture elements, which are arrayed along the main scanning direction, is carried out with the function g and the function h each time the position of the filtering processing is shifted by a single picture element in the sub-scanning direction. In this manner, wavelet transform factor signals Wg1 and Wh1 with respect to the main scanning direction of the wavelet transform factor signal $VV_0$ are obtained.

The number of the picture elements represented by the wavelet transform factor signal $VV_0$ is equal to ½ of the number of the picture elements, which are represented by the original image signal Sorg, both in the main scanning direction and in the sub-scanning direction. Therefore, the resolution of the image represented by the wavelet transform factor signal $VV_0$ is equal to ½ of the resolution of the image represented by the original image signal Sorg. Accordingly, as a result of the filtering processing carried out with the function g and the function h on the wavelet transform factor signal $VV_0$, the wavelet transform factor signals Wg1 and Wh1 representing the frequency components, which are lower than the frequency components represented by the wavelet transform factor signal $VV_0$ and which are among the frequency components of the original image signal Sorg, are obtained.

The wavelet transform factor signals Wg1 and Wh1 are obtained in the manner described above. Thereafter, for each of the wavelet transform factor signals Wg1 and Wh1, the signal components representing the picture elements located along the main scanning direction are thinned out alternately. In this manner, the number of the picture elements located along the main scanning direction is reduced even further to ½. Filtering processing is then carried out with the function g and the function h on the signal components of the thinned-out wavelet transform factor signals Wg1 and Wh1, which signal components represent picture elements located along the sub-scanning direction. From the filtering processing, wavelet transform factor signals $WW_1$, $WV_1$, $VW_1$, and $VV_1$ are obtained.

Thereafter, for each of the wavelet transform factor signals $WW_1$, $WV_1$, $VW_1$, and $VV_1$, the signal components representing the picture elements located along the sub-scanning direction are thinned out alternately. In this manner, the number of the picture elements located along the sub-scanning direction is reduced to ½. As a result, the number of the picture elements represented by each of the wavelet transform factor signals $WW_1$, $WV_1$, $VW_1$, and $VV_1$ becomes equal to ¹⁄₁₆ of the number of the picture elements represented by the original image signal Sorg.

Thereafter, in the same manner as that described above, filtering processing is carried out with the function g and the function h on the signal components of the thinned-out wavelet transform factor signal $VV_1$, which represent picture elements located along the main scanning direction. Then, for each of the wavelet transform factor signals, which have thus been obtained, the signal components representing the picture elements located along the main scanning direction are thinned out alternately. Filtering processing is then carried out with the function g and the function h on the signal components of the thinned-out wavelet transform factor signals, which signal components represent picture elements located along the sub-scanning direction. From the filtering processing, wavelet transform factor signals $WW_2$, $WV_2$, $VW_2$, and $VV_2$ are obtained.

The wavelet transform described above is iterated N number of times, and wavelet transform factor signals $WW_0$ through $WW_N$, $WV_0$ through $WV_N$, $VW_0$ through $VW_N$, and $VV_N$ are thereby obtained. The number of the picture elements represented by each of the wavelet transform factor signals $WW_N$, $WV_N$, $VW_N$, and $VV_N$, which are obtained from the N'th wavelet transform, is equal to $(\frac{1}{2})^N$ of the number of the picture elements, which are represented by the original image signal Sorg, both in the main scanning direction and in the sub-scanning direction. Therefore, as the value of N becomes larger, each wavelet transform factor signal is of a lower frequency band and represents lower frequency components among the frequency components of the original image signal Sorg.

Accordingly, a wavelet transform factor signal $WW_i$ (wherein i=0 to N, this also applies to the descriptions below) represents a change in the frequency of the original image signal Sorg both in the main scanning direction and in the sub-scanning direction. As the value of i becomes larger, the wavelet transform factor signal $WW_i$ becomes a lower frequency signal. A wavelet transform factor signal $WV_i$ represents a change in the frequency of the original image signal Sorg in the main scanning direction. As the value of i becomes larger, the wavelet transform factor signal $WV_i$ becomes a lower frequency signal. A wavelet transform factor signal $VW_i$ represents a change in the frequency of the original image signal Sorg in the sub-scanning direction. As the value of i becomes larger, the wavelet transform factor signal $VW_i$ becomes a lower frequency signal.

Figure 4:
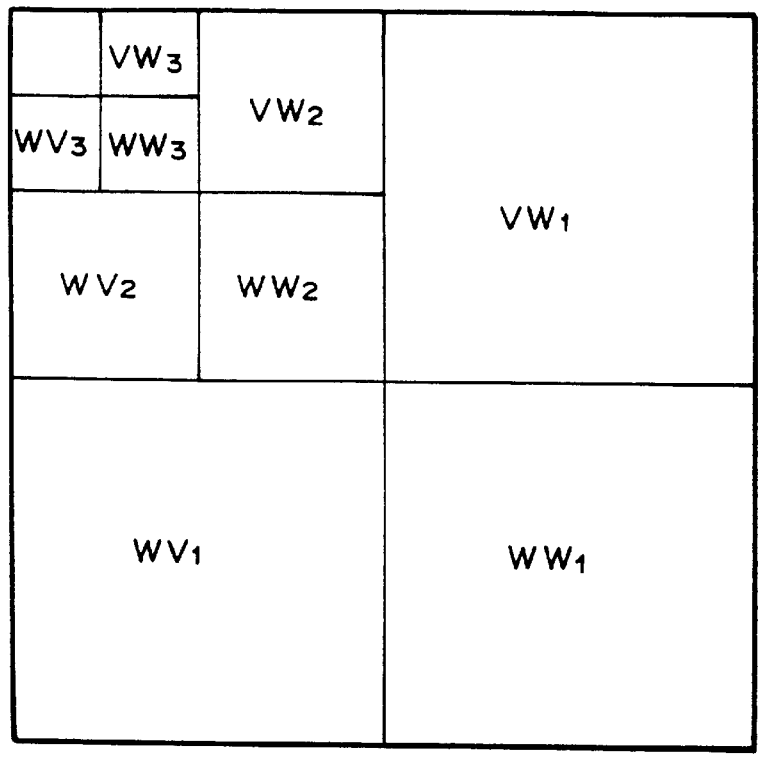
FIG. 4 is an explanatory view showing wavelet transform factor signals.

FIG. 4 shows the wavelet transform factor signals for the respective frequency bands. As an aid in facilitating the explanation, the wavelet transform factor signals having been obtained from the first, second, and third wavelet transforms are illustrated in FIG. 4. In FIG. 4, the wavelet transform factor signal $WW_3$ represents an image, which is obtained by reducing the original image to $(½)^3$ in each of the main scanning direction and the sub-scanning direction.

Thereafter, quantization is carried out on the wavelet transform factor signals $WV_i$, $VW_i$, and $WW_i$. If a large number of bits are allocated per picture element during the quantization of an image signal, the image signal can be compressed such that an image close to the original image can be restored from the compressed image signal, but the compressibility cannot be kept high. If a small number of bits are allocated per picture element during the quantization of an image signal, the compressibility can be kept high. However, in such cases, large errors will occur in restoring an image from the compressed image signal, and the restored image will contain more noise than in the original image.

Therefore, in this embodiment, the quantization should preferably be carried out such that a small number of bits per picture element may be allocated to an image signal of a high frequency band, which image signal carries much noise, and a large number of bits per picture element may be allocated to an image signal of a low frequency band, which image signal carries the information representing the major object. Also, for each of the wavelet transform factor signals $WV_i$, $VW_i$, and $WW_i$, the number of bits per picture element is not kept the same over the entire wavelet transform factor signal. Specifically, a large number of bits are allocated to each of picture elements in an important portion of the image, which is represented by each of the wavelet transform factor signals $WV_i$, $VW_i$, and $WW_i$, such that the image quality of the important portion of the image may be kept good. Also, a small number of bits are allocated to each of picture elements in an unimportant portion of the image, which is represented by each of the wavelet transform factor signals $WV_i$, $VW_i$, and $WW_i$, such that the compressibility may be kept high. In this manner, as a whole, the compressibility is kept high, while the image quality of the major portion of the image is being kept good.

Each of the wavelet transform factor signals $WV_i$, $VW_i$, and $WW_i$ is quantized in the manner described above. Thereafter, the quantized signals having been obtained from the quantization are encoded.

Figure 5:
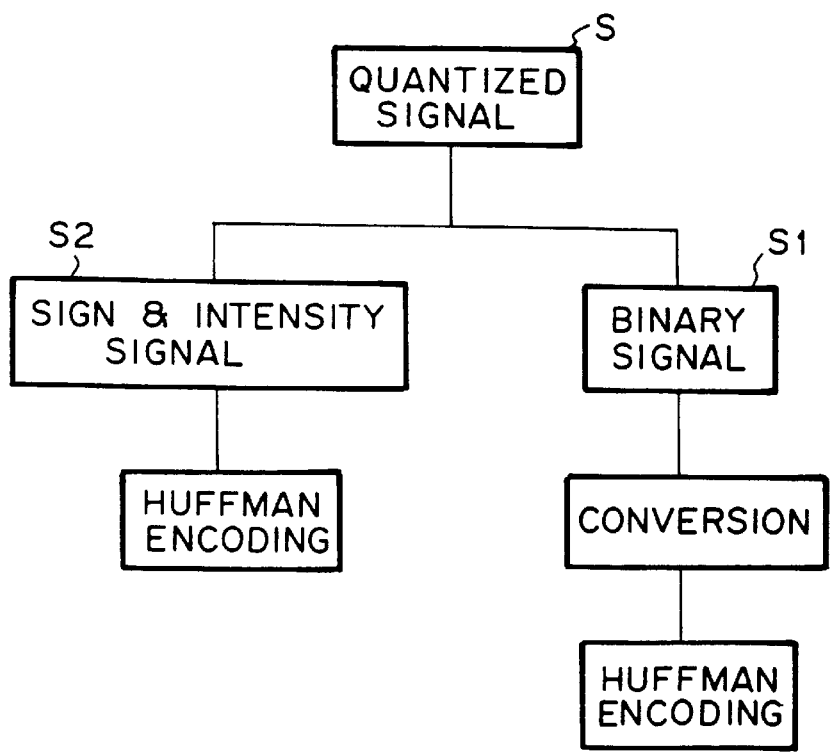
FIG. 5 is a block diagram showing a fundamental concept behind an embodiment of the signal encoding method in accordance with the present invention.
Figure 6:
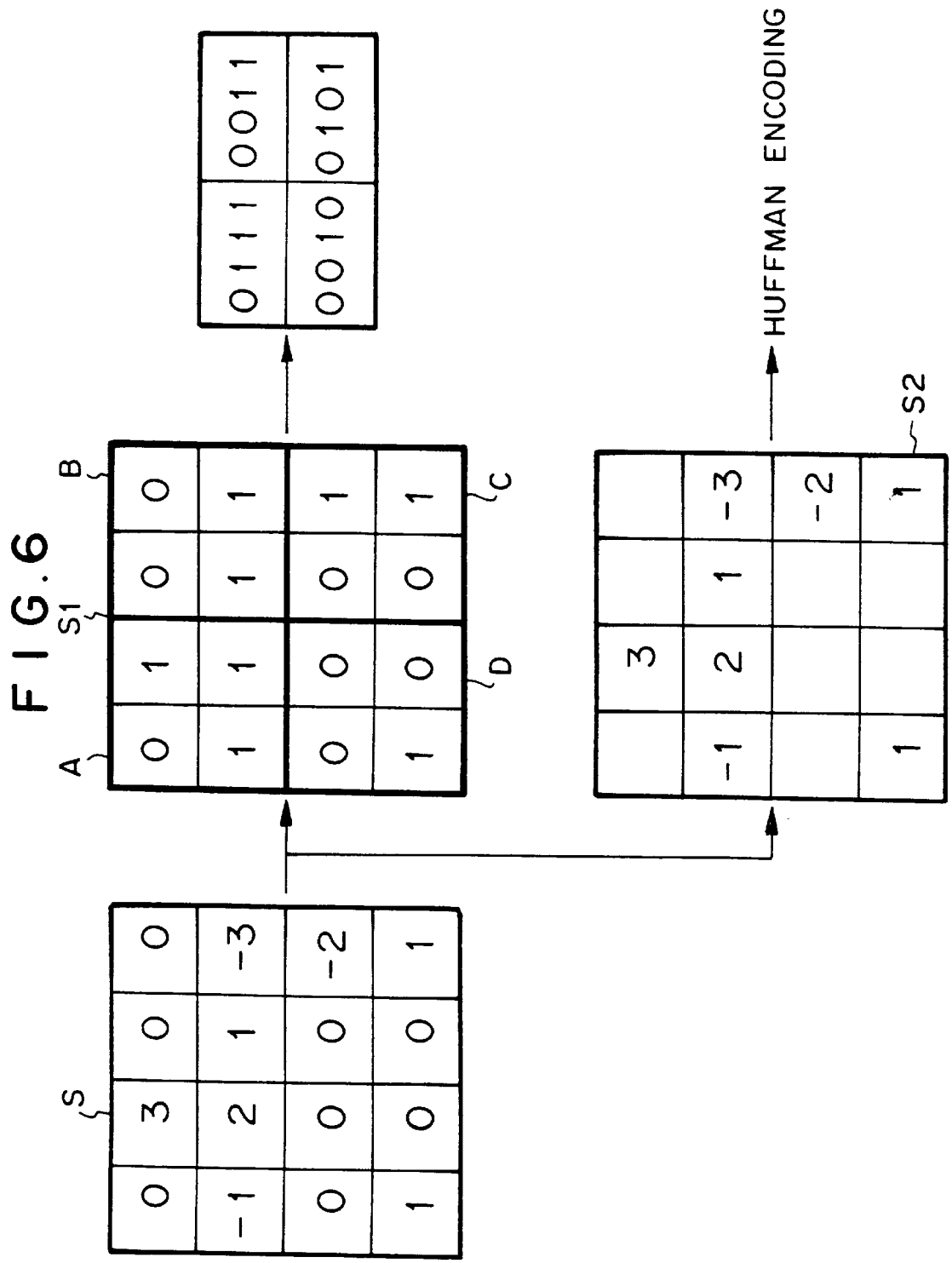
FIG. 6 is an explanatory view showing how a signal is processed in the embodiment of the signal encoding method in accordance with the present invention.

FIG. 5 is a block diagram showing a fundamental concept behind the embodiment of the signal encoding method in accordance with the present invention. FIG. 6 is an explanatory view showing how a signal is processed in the embodiment of the signal encoding method in accordance with the present invention. In FIG. 5, each of the quantized wavelet transform factor signals $WV_i$, $VW_i$, and $WW_i$ having been obtained from the quantization is expressed as a quantized signal S. In FIG. 6, as an aid in facilitating the explanation, a signal representing 4×4 picture elements is employed.

As illustrated in FIG. 5, firstly, the quantized signal S is separated into a binary signal S1, which represents whether the signal values of the quantized signal S are equal to zero or are other than zero, and a sign and intensity signal S2, which is constituted of a sign and intensity with respect to signal components of the quantized signal S, the signal values of which are other than zero. Specifically, the quantized signal S is separated into the binary signal S1 and the sign and intensity signal S2, which are illustrated in FIG. 6. As illustrated in FIG. 6, the binary signal S1 is a signal of 1 bit per picture element and represents a value of zero or one.

Thereafter, the binary signal S1 is converted such that the information of the binary signal S1, which represents 4×4 (=16) picture elements, may be converted into the information of a single picture element. Specifically, as illustrated in FIG. 6, the binary signal S1 is divided into four regions A, B, C, and D, each of which comprises 2×2 (=4) picture elements, and the information representing the four picture elements falling within each of the regions is converted into the information representing a single picture element. Since the binary signal S1 carries the information of 1 bit per picture element, in cases where the information of the binary signal S1, which represents 4×4 (=16) picture elements, is converted into the information representing a single picture element, a signal of 16 bits per picture element can be obtained.

The converted binary signal S1 having thus been obtained from the conversion is then encoded with Huffman encoding. With the encoding, in the shortest case, four picture elements can be represented with 1 bit. In such cases, the mean code length becomes equal to 0.25 bit (=1 bit/4 picture elements).

The sign and intensity signal S2 is not processed and is directly encoded with the Huffman encoding.

In the manner described above, the quantized signal S is separated into the binary signal S1 and the sign and intensity signal S2. The binary signal S1 is converted in the manner described above, and the converted binary signal S1 is encoded with the Huffman encoding. As a result, the mean code length can be kept short. Specifically, the mean code length can be reduced to a value shorter than the limit value (1 bit per picture element) in the Huffman encoding. Therefore, even in cases where the amount of information per picture element is less than 1 bit, the encoding efficiency can be prevented from becoming low, and the encoding can be carried out efficiently. Also, in this embodiment, since the four neighboring picture elements are processed as a single picture element, the encoding efficiency can be enhanced, and the amount of information can be reduced. Therefore, the entropy can be enhanced, and the amount of signal after being encoded can thereby be reduced even further. Further, since the amount of signal can thus be reduced, a large number of signal files can be stored on a recording medium, and the signal storage cost can be kept low. Furthermore, since the amount of signal can be kept small, the time required to transfer the signal can be kept short.

Figure 7:
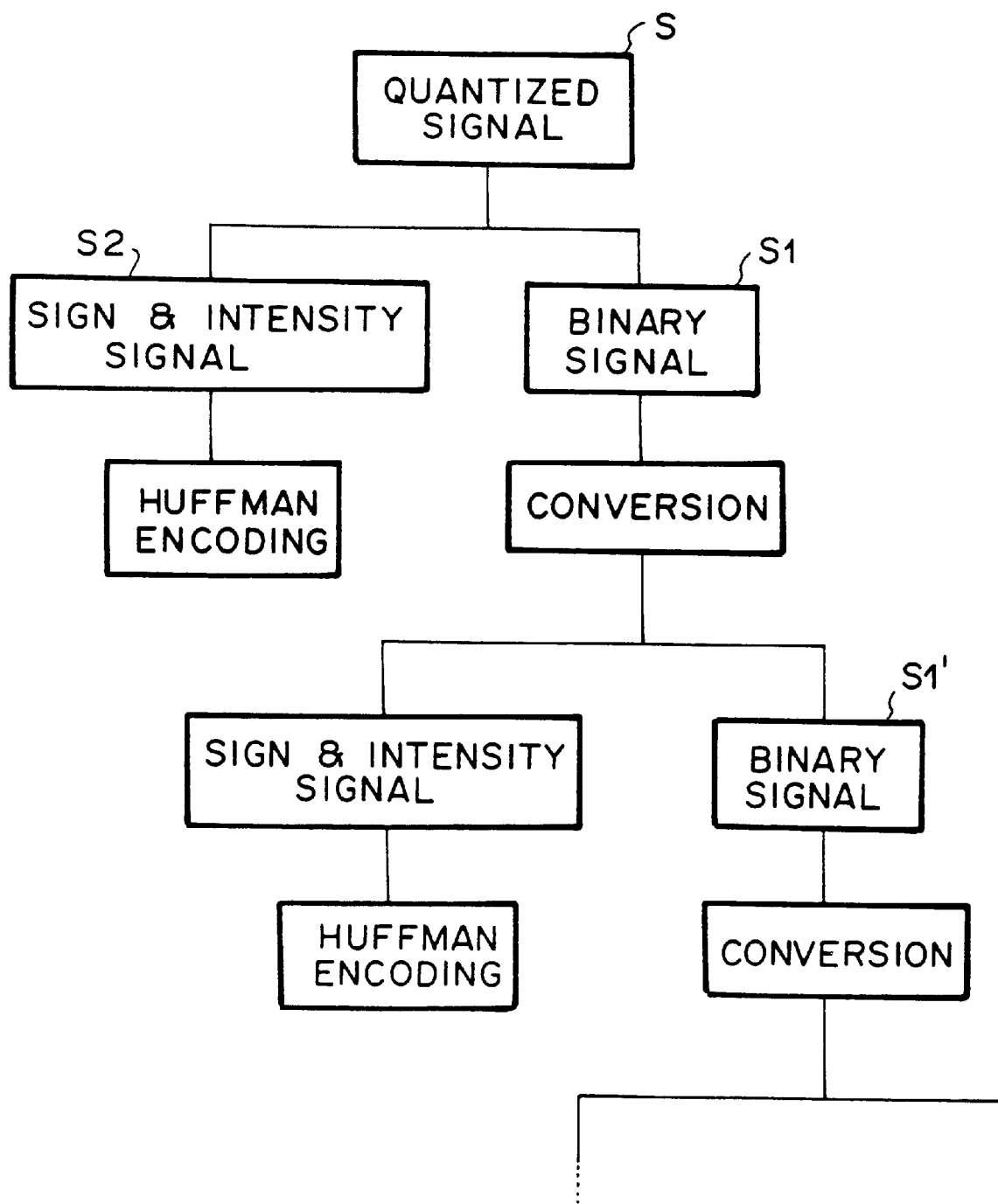
FIG. 7 is a block diagram showing a fundamental concept behind a different embodiment of the signal encoding method in accordance with the present invention.

FIG. 7 is a block diagram showing a fundamental concept behind a different embodiment of the signal encoding method in accordance with the present invention. As in the embodiment illustrated in FIG. 7, the converted binary signal S1, which has been obtained from the conversion in the manner described above, may further be separated into a binary signal S1', which represents whether the signal values are equal to zero or are other than zero, and a sign and intensity signal, which is constituted of a sign and intensity with respect to signal components having signal values other than zero. Thereafter, the thus obtained binary signal S1' may be converted such that the information of the binary signal S1', which represents four picture elements, may be converted into a signal, which represents a single picture element. The processing for carrying out the aforesaid separation of the converted binary signal and the aforesaid conversion may be iterated a plurality of times. In cases where the processing on the binary signal is thus iterated, the mean code length can be shortened even further, and the encoding efficiency can be enhanced even further. For example, in cases where the processing on the binary signal is iterated two times, the mean code length of the signal, which is obtained by converting the binary signal S1' and encoding the converted binary signal S1' with the Huffman encoding, can be reduced to 0.0625 bit (=1/16). Also, in such cases, if a simple code (4 bits) is employed in lieu of the Huffman code during the encoding of the binary signals S1 and S1', the signal encoding can be carried out with a simpler constitution.

The image signal, which has thus been obtained by encoding and compressing the original image signal Sorg, is stored on a recording medium, such as an optical disk, or is transmitted.

How the original image signal Sorg is reconstructed from the compressed image signal will be described hereinbelow.

Firstly, the decoding with respect to the aforesaid encoding is carried out on the compressed image signal. In this manner, the wavelet transform factor signals $WV_i$, $VW_i$, and $WW_i$ are obtained.

Thereafter, the inverse wavelet transform is carried out on the wavelet transform factor signals $WV_i$, $VW_i$, and $WW_i$, which have been obtained from the decoding.

Figure 8:
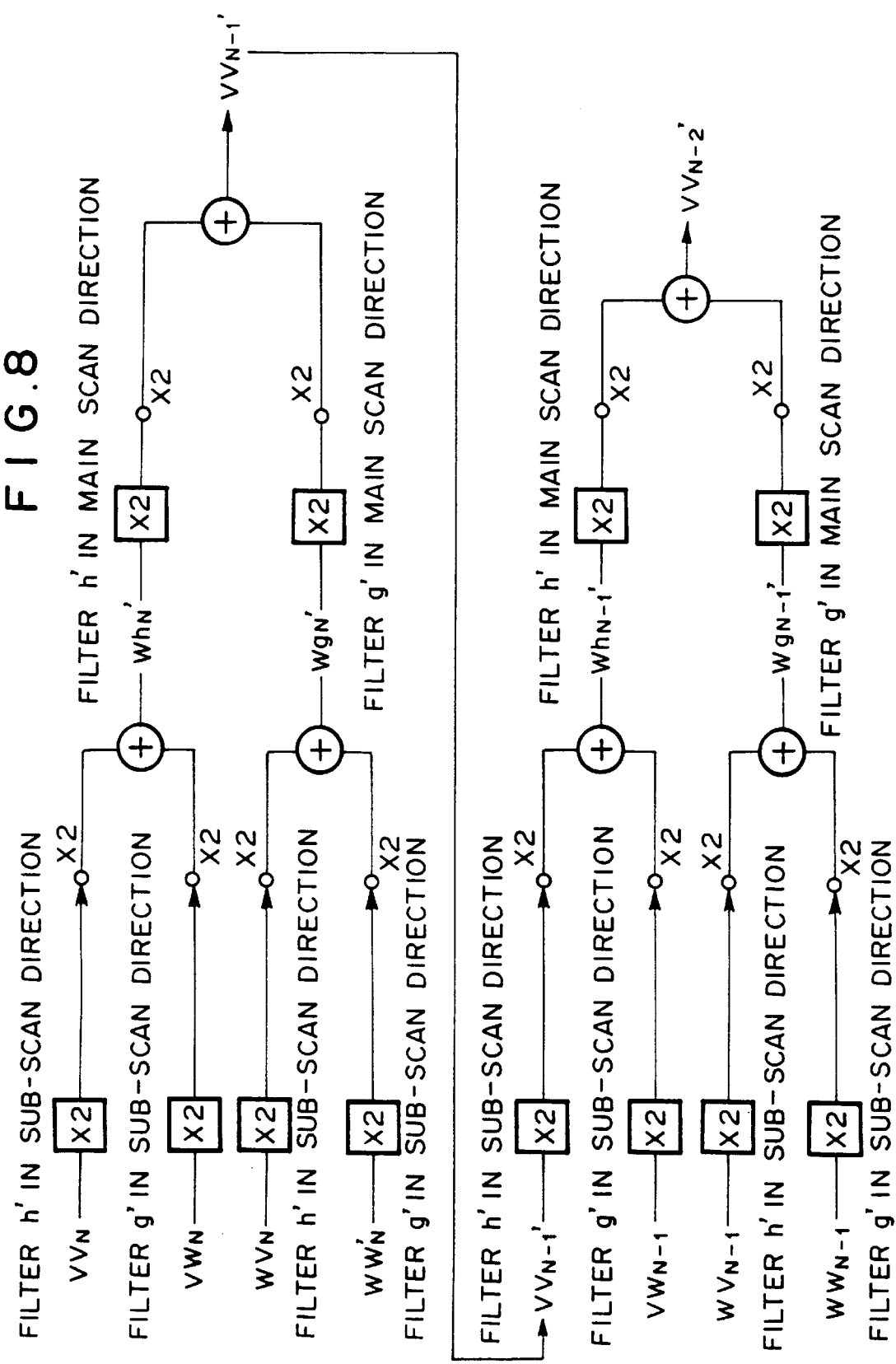
FIG. 8 is a flow chart showing how inverse wavelet transform is carried out.
Figure 9:
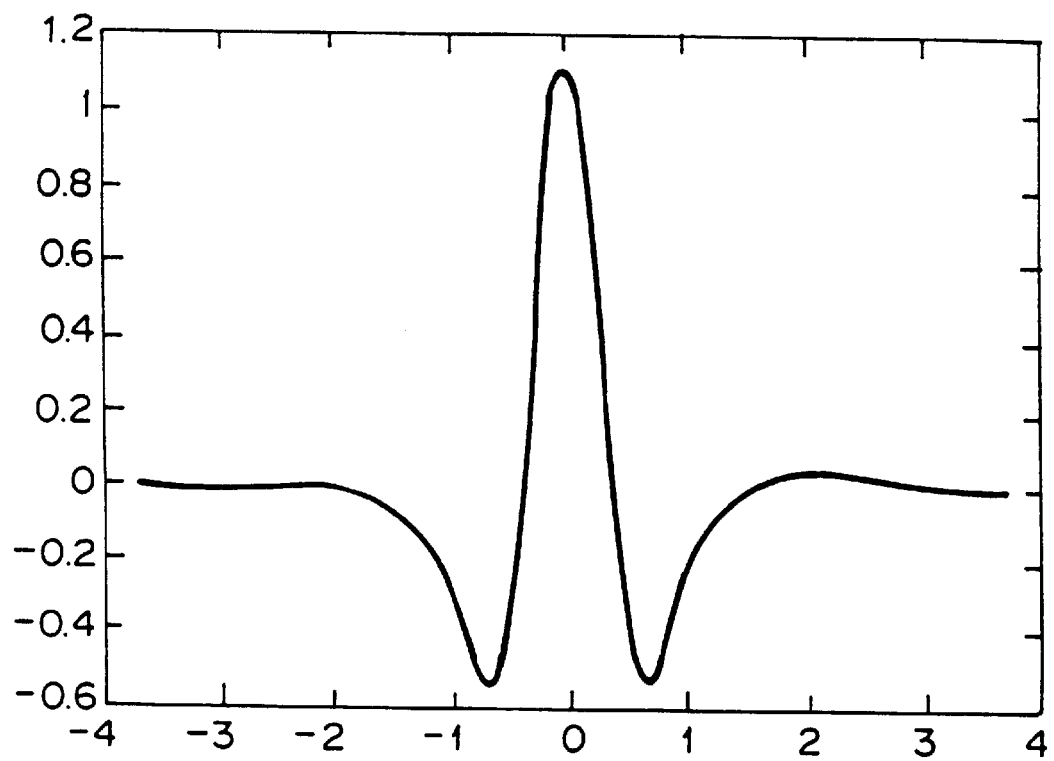
FIG. 9 is a graph showing a basic wavelet function employed in the wavelet transform.
Figure 10:
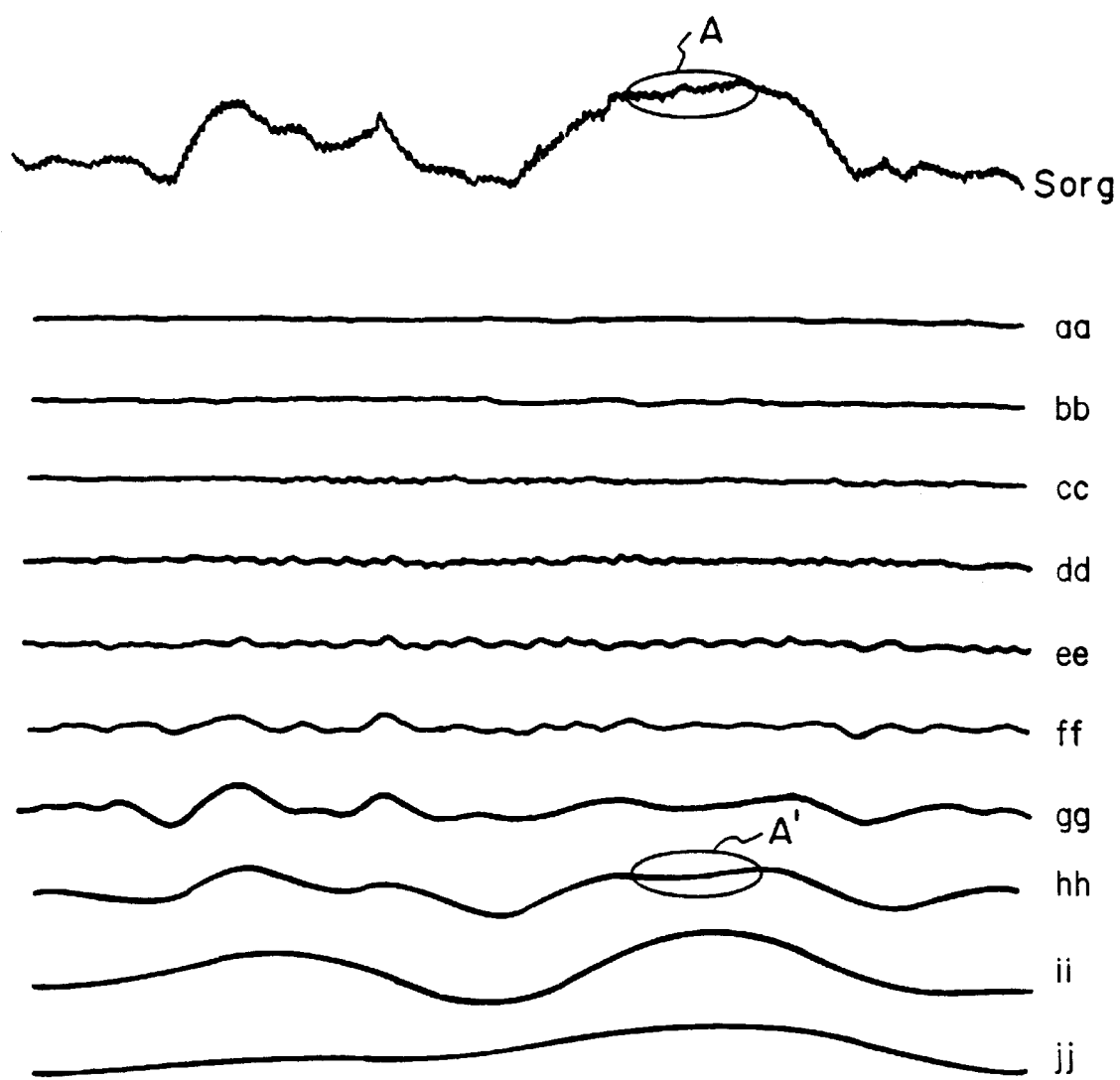
FIG. 10 is a diagram showing signals, which are obtained by carrying out the wavelet transform on an original signal Sorg and then carrying out inverse wavelet transform for each of frequency bands.
Figure 11:
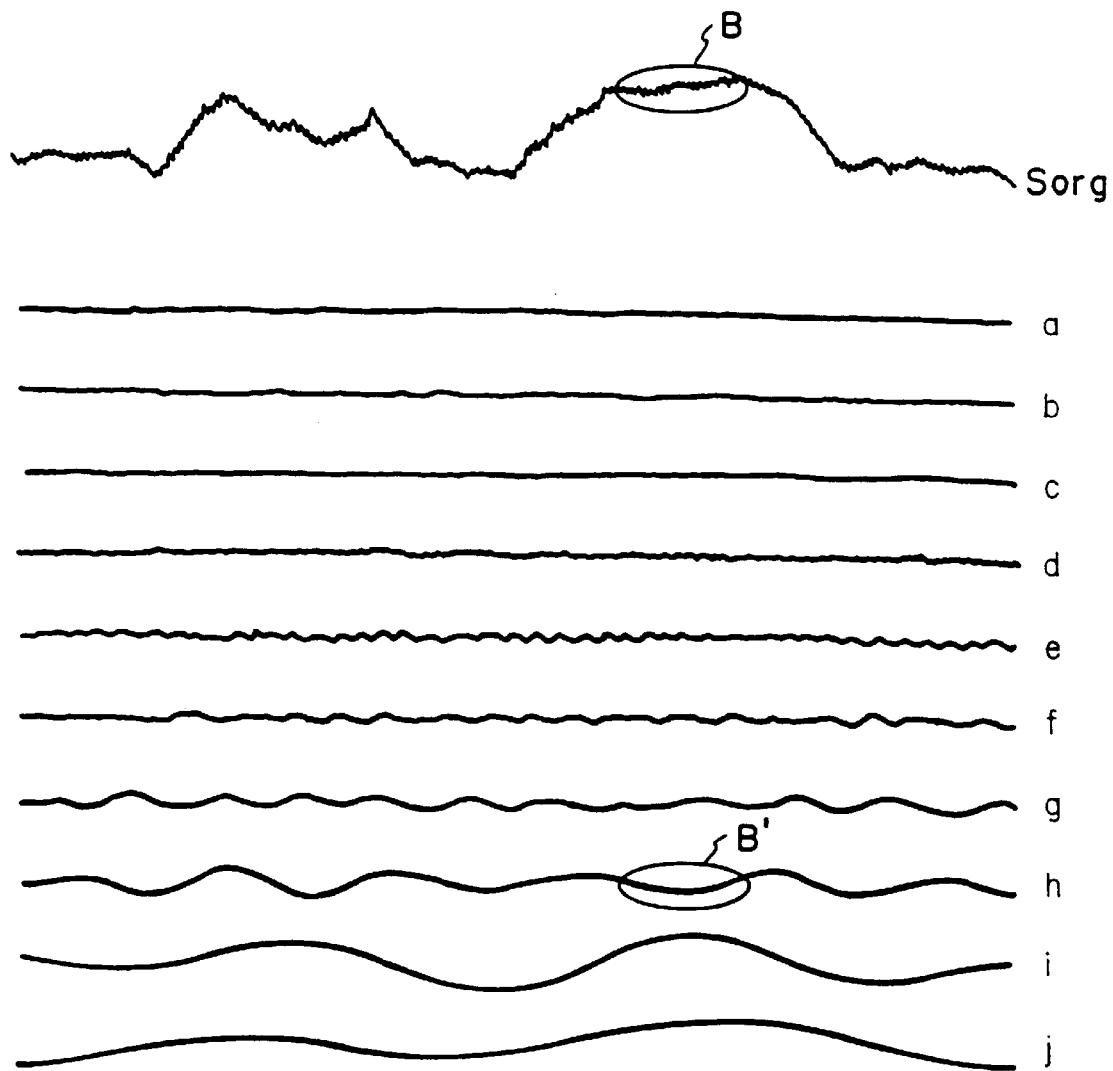
FIG. 11 is a diagram showing signals, which are obtained by carrying out Fourier transform on the original signal Sorg and then carrying out inverse Fourier transform for each of the frequency bands.

FIG. 8 is a flow chart showing how inverse wavelet transform is carried out.

As illustrated in FIG. 8, each of the wavelet transform factor signals $VV_N$, $VW_N$, $WV_N$, and $WW_N$ is subjected to the processing for leaving a space, which has a length equal to the length of a single picture element, between adjacent picture elements located along the sub-scanning direction. (In FIG. 8, this processing is expressed as ×2.) Filtering processing is then carried out with a function h', which is different from the aforesaid function h, on the signal components of the wavelet transform factor signal $VV_N$ provided with the spaces, which signal components represent picture elements located along the sub-scanning direction. Also, filtering processing is carried out with a function g', which is different from the aforesaid function g, on the signal components of the wavelet transform factor signal $VW_N$ provided with the spaces, which signal components represent picture elements located along the sub-scanning direction.

Specifically, the filtering processing on the image signal components of the wavelet transform factor signal $VV_N$ representing each column of the picture elements, which are arrayed along the sub-scanning direction, is carried out with the function h' each time the position of the filtering processing is shifted by a single picture element in the main scanning direction. Also, the filtering processing on the image signal components of the wavelet transform factor signal $VW_N$ representing each column of the picture elements, which are arrayed along the sub-scanning direction, is carried out with the function g' each time the position of the filtering processing is shifted by a single picture element in the main scanning direction. In this manner, inverse wavelet transform factor signals are obtained from the wavelet transform factor signals $VV_N$ and $VW_N$. The inverse wavelet transform factor signals are then doubled and added to each other. In this manner, an inverse wavelet transform factor signal WhN' is obtained.

As described above, the function for the wavelet transform and the function for the inverse wavelet transform are different from each other. Specifically, it is difficult to design functions, which become identical in the wavelet transform and the inverse wavelet transform, i.e. which are the orthogonal functions. Therefore, it is necessary to relieve the conditions of orthogonality, continuity, shortness of function, or symmetry. Accordingly, in this embodiment, the conditions of orthogonality are relieved, and the functions satisfying the other conditions are thereby selected.

As described above, in this embodiment, the functions h and g for the wavelet transform and the functions h' and g' for the inverse wavelet transform are biorthogonal different functions. Therefore, the original image signal can be perfectly restored by subjecting the wavelet transform factor signals $VV_i$, $VW_i$, $WV_i$, and $WW_i$ to inverse wavelet transform with the functions h' and g'.

Also, filtering processing is carried out with the function h' on the signal components of the wavelet transform factor signal $WV_N$, which represent picture elements located along the sub-scanning direction. Also, filtering processing is carried out with the function g' on the signal components of the wavelet transform factor signal $WW_N$, which represent picture elements located along the sub-scanning direction. In this manner, inverse wavelet transform factor signals are obtained from the wavelet transform factor signals $WV_N$ and $WW_N$. The inverse wavelet transform factor signals are then doubled and added to each other. In this manner, an inverse wavelet transform factor signal WgN' is obtained.

Thereafter, each of the inverse wavelet transform factor signals WhN' and WgN' is subjected to the processing for leaving a space, which has a length equal to the length of a single picture element, between adjacent picture elements located along the main scanning direction. Filtering processing is then carried out with the function h' on the signal components of the inverse wavelet transform factor signal WhN', which represent picture elements located along the main scanning direction. Also, filtering processing is carried out with the function g' on the signal components of the inverse wavelet transform factor signal WgN', which represent picture elements located along the main scanning direction. In this manner, inverse wavelet transform factor signals are obtained from the inverse wavelet transform factor signals WhN' and WgN'. The inverse wavelet transform factor signals, which have thus been obtained, are then doubled and added to each other. In this manner, an inverse wavelet transform factor signal $WN_{N-1}'$ is obtained.

Thereafter, each of the inverse wavelet transform factor signal $VV_{N-1}'$ and the wavelet transform factor signals $VW_{N-1}$, $WV_{N-1}$, and $WW_{N-1}$ is subjected to the processing for leaving a space, which has a length equal to the length of a single picture element, between adjacent picture elements located along the sub-scanning direction. Filtering processing is then carried out with the function h' on the signal components of the inverse wavelet transform factor signal $VV_{N-1}'$, which represent picture elements located along the sub-scanning direction. Also, filtering processing is carried out with the function g' on the signal components of the wavelet transform factor signal $VW_{N-1}$, which represent picture elements located along the sub-scanning direction.

Specifically, the filtering processing on the image signal components of the inverse wavelet transform factor signal $VN_{N-1}'$ representing each column of the picture elements, which are arrayed along the sub-scanning direction, is carried out with the function h' each time the position of the filtering processing is shifted by a single picture element in the main scanning direction. Also, the filtering processing on the image signal components of the wavelet transform factor signal $VW_{N-1}$ representing each column of the picture elements, which are arrayed along the sub-scanning direction, is carried out with the function g' each time the position of the filtering processing is shifted by a single picture element in the main scanning direction. In this manner, inverse wavelet transform factor signals are obtained from the inverse wavelet transform factor signal $VV_{N-1}'$ and the wavelet transform factor signal $VW_{N-1}$. The inverse wavelet transform factor signals, which have been obtained in this manner, are then doubled and added to each other. In this manner, an inverse wavelet transform factor signal WhN-1' is obtained.

Also, filtering processing is carried out with the function h' on the signal components of the wavelet transform factor signal $WV_{N-1}$, which represent picture elements located along the sub-scanning direction. Also, filtering processing is carried out with the function g' on the signal components of the wavelet transform factor signal $WW_{N-1}$, which represent picture elements located along the sub-scanning direction. In this manner, inverse wavelet transform factor signals are obtained from the wavelet transform factor signals $WV_{N-1}$ and $WW_{N-1}$. The inverse wavelet transform factor signals, which have been obtained in this manner, are then doubled and added to each other. In this manner, an inverse wavelet transform factor signal WgN-1' is obtained.

Thereafter, each of the inverse wavelet transform factor signals WhN-1' and WgN-1' is subjected to the processing for leaving a space, which has a length equal to the length of a single picture element, between adjacent picture elements located along the main scanning direction. Filtering processing is then carried out with the function h' on the signal components of the inverse wavelet transform factor signal WhN-1', which represent picture elements located along the main scanning direction. Also, filtering processing is carried out with the function g' on the signal components of the inverse wavelet transform factor signal WgN-1', which represent picture elements located along the main scanning direction. In this manner, inverse wavelet transform factor signals are obtained from the inverse wavelet transform factor signals WhN-1' and WgN-1'. The inverse wavelet transform factor signals, which have been obtained in this manner, are then doubled and added to each other. In this manner, an inverse wavelet transform factor signal $VV_{N-2}'$ is obtained.

Thereafter, inverse wavelet transform factor signals $VV_i'$ (wherein i=-1 to N) are sequentially created, and an inverse wavelet transform factor signal $VV_{-1}'$ is finally obtained. The finally obtained inverse wavelet transform factor signal $VV_{-1}'$ serves as an image signal representing the original image signal Sorg.

The inverse wavelet transform factor signal $VV_{-1}'$ which has thus been obtained is fed into an image reproducing apparatus (not shown) and is used for the reproduction of a visible radiation image.

The image reproducing apparatus may be a display device, such as a cathode ray tube (CRT) display device, or a recording apparatus for recording an image on photosensitive film by scanning the photosensitive film with a light beam.

In the embodiments described above, the image is transformed into the multi-resolution images by using the wavelet transform. However, the signal encoding method in accordance with the present invention is not limited to the use of the wavelet transform. For example, the aforesaid Laplacian pyramid technique or the Fourier transform may be utilized in order to transform the image into the multi-resolution images. Also, in the embodiments described above, the encoding is carried out on the image signals, which have been obtained from the multi-resolution transform. However, the signal encoding method in accordance with the present invention is also applicable when a signal, such as an ordinary image signal, is encoded.

Also, in the embodiments described above, the functions having the characteristics shown in Table 1 are employed as the functions h and h' for the wavelet transform.

Alternatively, the functions having the characteristics shown in Table 2 or Table 3 may be employed as the functions h and h' for the wavelet transform.

TABLE 2

| n | 0 | ±1 | ±2 | ±3 | ±4 |
|---|---|---|---|---|---|
| $2^{-\frac{1}{2}}h$ | 0.6 | 0.25 | −0.05 | 0 | 0 |
| $2^{-\frac{1}{2}}h'$ | 17/28 | 73/280 | −3/56 | −3/280 | 0 |

TABLE 3

| n | 0 | ±1 | ±2 | ±3 | ±4 |
|---|---|---|---|---|---|
| $2^{-\frac{1}{2}}h$ | 45/64 | 19/64 | −1/8 | −3/64 | 3/128 |
| $2^{-\frac{1}{2}}h'$ | 1/2 | 1/4 | 0 | 0 | 0 |

Also, any of other functions, which can carry out the wavelet transform, may be employed. For example, functions, which are not biorthogonal nor symmetric, but which are orthogonal, may be employed.

The wavelet transform may be carried out by using the functions, each of which is symmetric with respect to the axis of n=0 as shown in Table 1, 2, or 3, or functions, each of which is asymmetric with respect to the axis of n=0. In cases where the wavelet transform has been carried out by using the functions, each of which is asymmetric with respect to the axis of n=0, the inverse wavelet transform is carried out by using the functions, which are obtained by inverting the functions used for the wavelet transform with respect to the axis of n=0. Specifically, the functions g' and h' for carrying out the inverse wavelet transform with respect to the functions g and h, each of which is asymmetric with respect to the axis of n=0, are expressed as $$g[n]=g'[-n]$$
$$h[n]=h'[-n] \quad (3)$$

wherein [−n] represents the inversion with respect to the axis.

Further, in the embodiments described above, the original image signal representing the radiation image is compressed. However, the signal encoding method in accordance with the present invention is also applicable when an image signal representing an ordinary image is compressed.

For example, the signal encoding method in accordance with the present invention may be applied when an image signal representing an image of a person as the major object, which is recorded on 35 mm negative film, is to be compressed. In such cases, the image is read out from the negative film by using a digital scanner, and the image signal representing the image is thereby obtained. The wavelet transform is then carried out on the image signal by carrying out the filtering processing with the functions g and h. Thereafter, the quantization is carried out on the wavelet transform factor signal, which has been obtained from the wavelet transform. The signal encoding in accordance with the present invention is then carried out, and the image signal is thereby compressed.

The original image signal can then be reconstructed by decoding the compressed image signal in the same manner as that in the aforesaid embodiments and then carrying out the inverse wavelet transform.

What is claimed is:

1. A signal encoding method for encoding a signal, comprising the steps of:

i) quantizing the signal, a quantized signal being thereby obtained, ii) separating said quantized signal into a binary signal, which represents whether the signal values of said quantized signal are equal to zero or are other than zero, and a sign and intensity signal, which is constituted of a sign and intensity with respect to signal components of said quantized signal having signal values other than zero, iii) converting said binary signal such that the information of said binary signal, which represents N picture elements, may be converted into a signal, which represents a single picture element and is composed of N bits, a converted binary signal being thereby obtained, and iv) encoding said converted binary signal and said sign and intensity signal;

wherein N is a positive integer greater than 1.

2. A method as defined in claim 1 wherein the processing for carrying out said separation, said conversion, and said encoding is iterated a plurality of times with respect to said converted binary signal.

3. A method as defined in claim 1 wherein the signal to be quantized is one of image signals, each of which is of one of a plurality of different frequency bands, said image signals having been obtained from multi-resolution transform.

4. A method as defined in claim 3 wherein said multi-resolution transform is carried out with a technique selected from the group consisting of a wavelet transform, a Laplacian pyramid technique, and a Fourier transform.

5. A method as defined in claim 1 wherein the signal to be quantized represents a radiation image.

6. A method as defined in claim 5 wherein the radiation image is stored on a stimulable phosphor sheet.

7. A method as defined in claim 1 wherein the signal to be quantized represents an image having been recorded on photographic film.

8. A method as defined in claim 1, wherein an image signal of higher frequency band is allocated less bits per picture element than an image signal of a lower frequency band.

\* \* \* \* \*